(12) United States Patent
McMeans (10) Patent No.: US 10,829,166 B2
(45) Date of Patent: Nov. 10, 2020

(54) VEHICLE BED EXTENDER

(71) Applicant: Xtendabed, LLC, Hatboro, PA (US)

(72) Inventor: Raymond J. McMeans, Hatboro, PA (US)

(73) Assignee: Xtendabed, LLC, Hatboro, PA (US)

( * ) Notice: Subject to any disclaimer, the term of this patent is extended or adjusted under 35 U.S.C. 154(b) by 0 days.

(21) Appl. No.: 16/468,332

(22) PCT Filed: Apr. 25, 2017

(86) PCT No.: PCT/US2017/029332
§ 371 (c)(1),
(2) Date: Jun. 11, 2019

(87) PCT Pub. No.: WO2018/118106
PCT Pub. Date: Jun. 28, 2018

(65) Prior Publication Data
US 2020/0010124 A1      Jan. 9, 2020

Related U.S. Application Data

(60) Provisional application No. 62/498,248, filed on Dec. 20, 2016.

(51) Int. Cl.
*B60P 3/40* (2006.01)
*B62D 33/027* (2006.01)
*B62D 33/03* (2006.01)

(52) U.S. Cl.
CPC ............ *B62D 33/0273* (2013.01); *B60P 3/40* (2013.01); *B62D 33/03* (2013.01)

(58) Field of Classification Search
CPC ........ B62D 33/0273; B62D 33/03; B60P 3/40

USPC ............................................... 296/26.11, 57.1
See application file for complete search history.

(56) References Cited

U.S. PATENT DOCUMENTS

| | | |
|---|---|---|
| 5,169,201 A | 12/1992 | Gower |
| 5,775,759 A | 7/1998 | Cummins |
| 5,816,637 A | 10/1998 | Adams et al. |
| 5,820,188 A | 10/1998 | Nash |
| 5,826,932 A | 10/1998 | DeSimone |
| 6,019,410 A | 2/2000 | Trostle et al. |

(Continued)

OTHER PUBLICATIONS

International Search Report and Written Opinion by the Korean Intellectual Property Office; dated Sep. 6, 2017; 13 pages.

(Continued)

*Primary Examiner* — Gregory A Blankenship
(74) *Attorney, Agent, or Firm* — Michael Crilly, Esquire (57) ABSTRACT

A vehicle bed extender for increasing cargo capacity of a storage area is presented. The vehicle bed extender includes a flexible member, a bracket, and at least one stiffener. The flexible member defines a back wall disposed between a pair of extension walls. The back wall and the extension walls have an upper end and a lower end. Each extension wall is separately and removably attachable to a side wall of a vehicle. The bracket is secured to a top end of a tailgate at two or more mount points. The bracket and the tailgate define a slot between each adjacent pair of mount points. At least one tab extends at the lower end along the back wall. The tab slidingly engages the slot to secure the flexible member to the tailgate. The stiffener is removably attached to the flexible member at the upper end.

15 Claims, 11 Drawing Sheets

(56) References Cited

U.S. PATENT DOCUMENTS

| | | | |
|---|---|---|---|
| 6,042,167 A | 3/2000 | Pierce et al. | |
| 6,179,360 B1 | 1/2001 | Davian | |
| 6,257,637 B1 | 7/2001 | Reed | |
| 6,279,980 B1 | 8/2001 | Straschewski | |
| 6,422,630 B1 * | 7/2002 | Heaviside | B62D 33/0273 |
| | | | 296/26.11 |
| 6,550,836 B2 * | 4/2003 | Rigau | B60R 11/06 |
| | | | 296/26.08 |
| 6,550,841 B1 * | 4/2003 | Burdon | B60P 3/40 |
| | | | 296/26.11 |
| 6,908,134 B1 * | 6/2005 | Summers | B60P 3/40 |
| | | | 296/26.11 |
| 7,021,689 B1 | 4/2006 | Weisbeck, III | |
| 7,111,885 B1 | 9/2006 | Hoffmann et al. | |
| 7,226,100 B1 | 6/2007 | Willey et al. | |
| 7,413,231 B1 | 8/2008 | Wood et al. | |
| 9,302,717 B1 * | 4/2016 | Rude | B60P 3/40 |
| 9,387,806 B2 * | 7/2016 | Bzoza | B60R 5/041 |
| 9,409,608 B2 * | 8/2016 | Waskie | B62D 33/0273 |
| 9,789,913 B2 * | 10/2017 | Singer | B62D 21/14 |
| 9,834,260 B2 * | 12/2017 | Quick | B62D 33/0273 |
| 2001/0005085 A1 * | 6/2001 | Bauer | B60P 1/435 |
| | | | 296/57.1 |
| 2006/0186685 A1 * | 8/2006 | Nagle | B62D 33/0273 |
| | | | 296/26.11 |
| 2006/0214449 A1 | 9/2006 | Klusmeier | |
| 2012/0228893 A1 | 9/2012 | Lu et al. | |
| 2017/0361757 A1 * | 12/2017 | Higgins | B60P 7/15 |
| 2020/0010124 A1 * | 1/2020 | McMeans | B62D 33/0273 |

OTHER PUBLICATIONS

International Preliminary Report on Patentability by the Korean Intellectual Property Office; dated Mar. 28, 2019; 18 pages.

Reply to Written Opinion with Amendments under Article 34 by Applicant; filed Sep. 22, 2017; 18 pages.

* cited by examiner

VEHICLE BED EXTENDER

CROSS REFERENCE TO RELATED APPLICATIONS

This application is a National Phase of PCT Application No. PCT/US2017/029332 filed Apr. 25, 2017 entitled Vehicle Bed Extender which claims priority to U.S. Provisional Application No. 62/498,248 filed Dec. 20, 2016 entitled Extend a Bed; all prior applications are hereby incorporated in their entirety by reference thereto.

FEDERALLY SPONSORED RESEARCH AND DEVELOPMENT

None.

BACKGROUND OF THE INVENTION

1. Field of the Invention

The invention generally relates to a vehicle bed extender and more particularly is concerned, for example, with an improvement for enlarging the cargo or storage area of a pickup truck or the like.

2. Background

A variety of vehicles include several walls and a tailgate configured about a bed thereby forming a storage area suitable for transporting materials. The length of a storage area is based in part on design tradeoffs and choices and therefore quite often too short to accommodate all reasonably anticipated uses. Dimensional deficiencies are sometimes avoided by placing the tailgate in a down and open position so that a portion of the materials is supported by the tailgate. Dimensional deficiencies are also avoided by resting the materials on an upright and closed tailgate so that a portion extends over the tailgate. Both solutions create safety hazards since materials not otherwise fully confined within the storage area are susceptible to inadvertently exiting the vehicle during transport resulting in bodily injury, property damage, and worse.

A variety of bed extenders are known within the art which provide a means whereby the storage area is enlarged by the planar dimensions of a tailgate. A typical extender is secured to a vehicle to provide a pair of side walls and a back wall about a tailgate so that the tailgate effectively functions as an extension of the vehicle bed.

Presently known bed extenders are problematic. For example, bed extenders often include numerous parts arranged to form a complex design such that assembly and disassembly are difficult, frustrating, and time consuming. In another example, bed extenders may be comprised of bulky and/or rigid components that frustrate compact storage. In yet another example, bed extenders limit expansion of a vehicle bed to the planar dimensions of a tailgate. The end results are products that discourage use, that occupy valuable space within a storage area of a vehicle when not in use, and that provide an inadequate solution by limiting expansion to the dimensions of a tailgate.

For at least the reasons discussed above, the benefits and advantages of vehicle bed extenders have yet to be completely realized.

Accordingly, what is required is a bed extender that simplifies assembly onto and disassembly from a vehicle.

Accordingly, what is required is a bed extender comprised of components that facilitate compact storage when not in use.

Accordingly, what is required is a bed extender that enlarges a cargo area beyond the dimensions of a tailgate.

SUMMARY OF THE INVENTION

An object of the invention is to provide a bed extender that simplifies assembly onto and disassembly from a vehicle.

An object of the invention is to provide a bed extender composed of components that facilitate compact storage when not in use.

An object of the invention is to provide a bed extender that enlarges a cargo area beyond the dimensions of a tailgate.

In accordance with embodiments of the invention, the vehicle bed extender includes a flexible member, a bracket, and at least one stiffener. The flexible member defines a back wall disposed between a pair of extension walls. The back wall and the extension walls have an upper end and a lower end. Each extension wall is separately and removably attachable to a side wall of a vehicle. The bracket is secured to one end of a tailgate at two or more mount points. The bracket and the tailgate define a slot between each adjacent pair of mount points. At least one tab extends at the lower end along the back wall. The tab slidingly engages the slot to secure the flexible member to the tailgate. The stiffener is removably attached to the flexible member at the upper end.

In accordance with other embodiments of the invention, the flexible member is a rubber belt.

In accordance with other embodiments of the invention, the rubber belt is fiber reinforced.

In accordance with other embodiments of the invention, the rubber belt is wire reinforced.

In accordance with other embodiments of the invention, the stiffener is disposed along at least a portion of the extension wall.

In accordance with other embodiments of the invention, the stiffener is disposed along at least a portion of the back wall.

In accordance with other embodiments of the invention, at least one channel is secured to the tailgate and the extension wall is removably attached to the channel at the lower end.

In accordance with other embodiments of the invention, a spacer is disposed between the bracket and the tailgate at the mount point so that the bracket and the spacer are secured to the tailgate.

In accordance with other embodiments of the invention, the extension wall is removably attachable to the side wall via an anchor along the side wall.

In accordance with other embodiments of the invention, a hole along the extension wall engages the anchor.

In accordance with other embodiments of the invention, a grommet along the extension wall slidingly engages the anchor.

In accordance with other embodiments of the invention, the tailgate is a primary tailgate rotatably attached to the vehicle.

In accordance with other embodiments of the invention, a flexible secondary tailgate is defined by the flexible member between the tab and the back wall. The flexible secondary tailgate, the back wall and a portion of each extension wall overhang from the primary tailgate.

In accordance with other embodiments of the invention, a pair of support arms are separately attached at one end to the primary tailgate and separately securable at another end to the flexible member.

In accordance with other embodiments of the invention, the support arm includes a horizontal member and a vertical member. The vertical member is rotatably disposed between the bracket and the primary tailgate.

In accordance with other embodiments of the invention, the vertical member is disposed between a pair of spacers. The vertical member and the spacers are disposed between and contact the bracket and the tailgate.

In accordance with other embodiments of the invention, the tailgate is a rigid secondary tailgate rotatably attached to a primary tailgate. The primary tailgate is rotatably attached to the vehicle.

In accordance with other embodiments of the invention, the bracket is secured to the secondary tailgate at the mount point via a spacer attached at one end to the bracket and at another end to the secondary tailgate.

In accordance with other embodiments of the invention, at least one channel is secured to the primary tailgate. The extension wall is removably attached to the channel at the lower end.

Exemplary advantages of the invention include, but are not limited to, the following. The invention simplifies attachment and detachment of components required to enlarge the usable volume of a cargo area. The invention minimize the number of parts required to enlarge the usable volume within a cargo area. The invention minimizes storage volume of the invention when not in use. The invention facilitates enlargement of the usable area within a cargo area whereby the cargo area extends beyond a tailgate directly attached to a vehicle.

The above and other objectives, features, and advantages of the preferred embodiments of the invention will become apparent from the following description read in connection with the accompanying drawings, in which like reference numerals designate the same or similar elements.

BRIEF DESCRIPTION OF THE DRAWINGS

Additional aspects, features, and advantages of the invention will be understood and will become more readily apparent when the invention is considered in the light of the following description made in conjunction with the accompanying drawings.

DETAILED DESCRIPTION OF THE INVENTION

Reference will now be made in detail to embodiments of the invention that are illustrated in the accompanying drawings. Wherever possible, same or similar reference numerals are used in the drawings and the description to refer to the same or like parts. The drawings are in simplified form and are not to precise scale.

While features of various embodiments are separately described herein, it is understood that such features may be combinable to form other additional embodiments.

Figure 1:
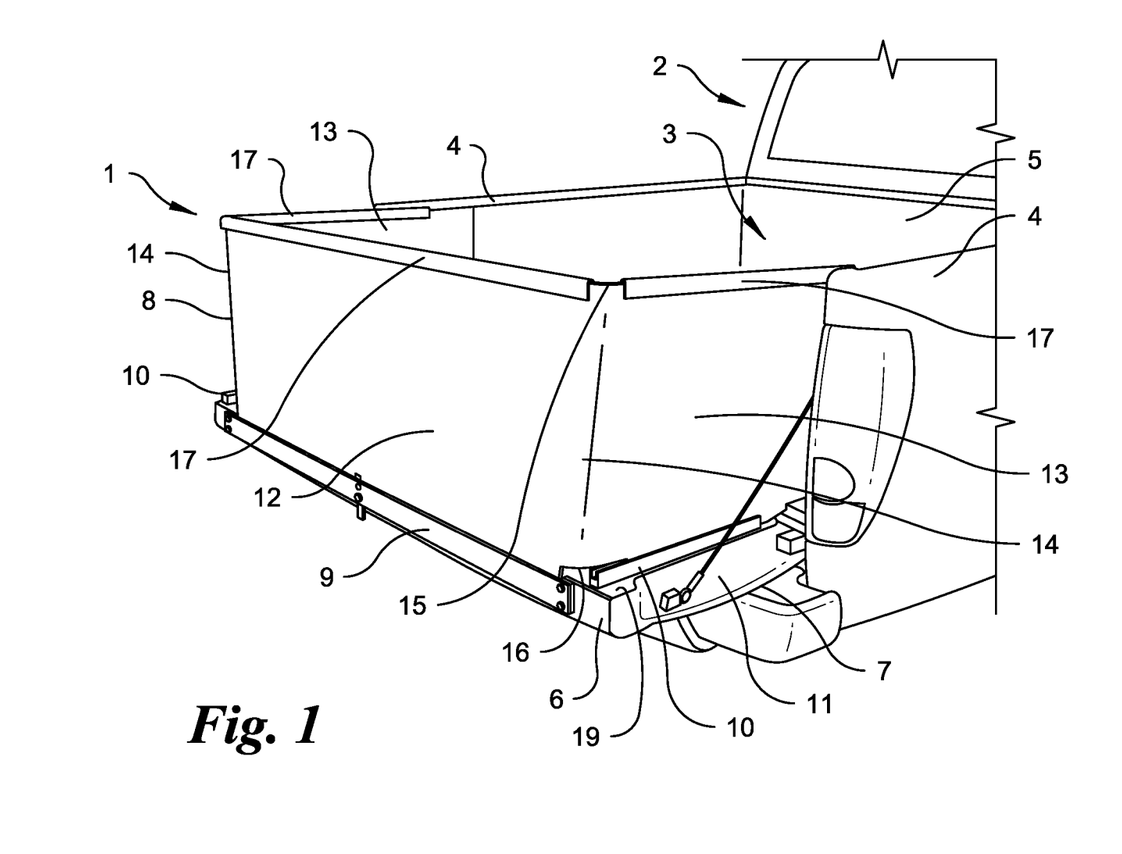
FIG. 1 is a perspective view illustrating a vehicle bed extender including a flexible member defining a back wall disposed between a pair of extension walls whereby the vehicle bed extender is attachable at the back end of a vehicle so that the storage area is enlarged by at least the dimensions of a tailgate in accordance with an embodiment of the invention.

Referring now to FIG. 1, the vehicle bed extender 1 generally comprises a flexible member 8, a bracket 9, and at least one stiffener 17 attachable to the back end of a vehicle 2. The vehicle 2 is understood to be a motorized pickup truck, dump truck or the like having a storage area 3 capable of accepting materials for transport. The storage area 3 may be defined by a front wall 5, side walls 4, and a tailgate 7. The tailgate 7 is generally a planar-shaped element attached to the vehicle 2 so as to be configurable between a vertical or closed orientation and a horizontal or open orientation. In preferred embodiments, the tailgate 7 is rotatable between vertical and horizontal orientations. In the vertical orientation, the tailgate 7 is upright and cooperates with the side walls 4 to enclose the storage area 3. In the horizontal orientation, the tailgate 7 is aligned lengthwise with respect to the bed within the storage area 3 so as to permit loading and unloading of materials. The vehicle bed extender 1 is understood to be attachable to a tailgate 7 when in a horizontal or nearly horizontal orientation.

Figure 2A:
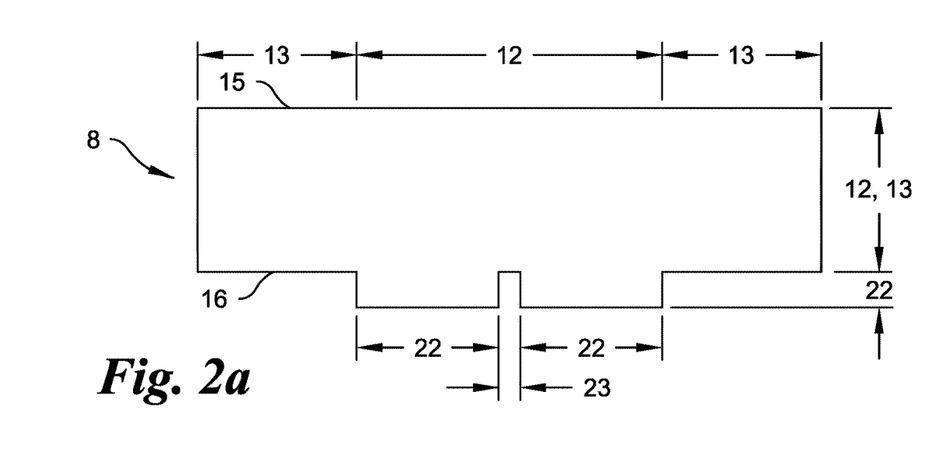
FIG. 2a is a plan view illustrating a flexible member before attachment onto a vehicle whereby the flexible member defines a back wall, a pair of extension walls, and a pair of tabs in accordance with an embodiment of the invention.
Figure 2B:
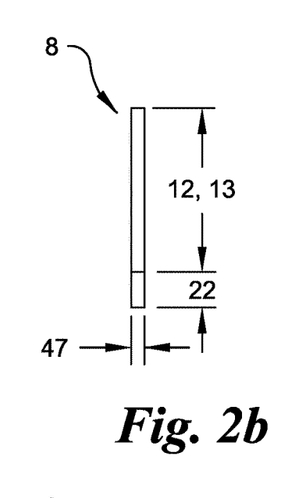
FIG. 2b is a side view further illustrating the flexible member in FIG. 2a in accordance with an embodiment of the invention.

Referring now to FIGS. 1, 2a and 2b, the flexible member 8 is a generally planar element composed of a bendable material capable of being bent, flexed, twisted, and/or stretched without breaking. In some embodiments, the composition and/or thickness 47 of the flexible member 8 minimizes bowing or sagging when oriented upright or vertical. In other embodiments, a bend 14 may be sufficient to properly stiffen the flexible member 8 in the vertical direction. Exemplary non-limiting compositions for the flexible member 8 may include rubber with or without reinforcement, the latter being, but not limited to, fiberglass fibers and metal wires. In one specific non-limiting example, the flexible member 8 may be fabricated from material suitable for use as a conveyor belt.

Referring again to FIGS. 1, 2a, and 2b, the flexible member 8 is configured to define a pair of extension walls 13 separately disposed about a back wall 12 between an upper end 15 and a lower end 16. At least one tab 22 extends from the lower end 16 in the direction away from the back wall 12. In preferred embodiments, a notch 23 is provided between adjoining tabs 22.

Referring again to FIG. 1, the flexible member 8 is secured to the tailgate 7 so that the back wall 12 is adjacent to a top end 6 of the tailgate 7 and each extension wall 13 is adjacent to a side end 11 of the tailgate 7. A bend 14 is vertically disposed between the back wall 12 and each extension wall 13 so that the flexible member 8 generally conforms to the perimeter of the tailgate 7. In preferred embodiments, the back wall 12 and the extension walls 13 are oriented so as to be substantially perpendicular to the upper surface 19 of the tailgate 7 to the extent permitted by the flexible member 8, the bends 14, the stiffeners 17, and the channels 10.

Referring again to FIG. 1, a stiffener 17 may be secured to the flexible member 8 at the upper end 15 of the back wall 12 and/or one or both extension walls 13. In some embodiments, the stiffener 17 may be one contiguous element secured the upper edge 15 so as to traverse one or both extension walls 13 and the back wall 12. In other embodiments, a stiffener 17 may be secured to at least a portion of each extension wall 13 and the back wall 12 as shown in FIG. 1. In some embodiments, the lower end 16 of each extension wall 13 may engage a channel 10 secured to the upper surface 19 of the tailgate 7. The combination of a stiffener 17 and a channel 10 along the extension wall 13 may be advantageous to maintaining the vertical orientation of the flexible member 8 and further to securing the flexible member 8 to the tailgate 7 and the side walls 4.

Figures 3A, 3B, 3C:
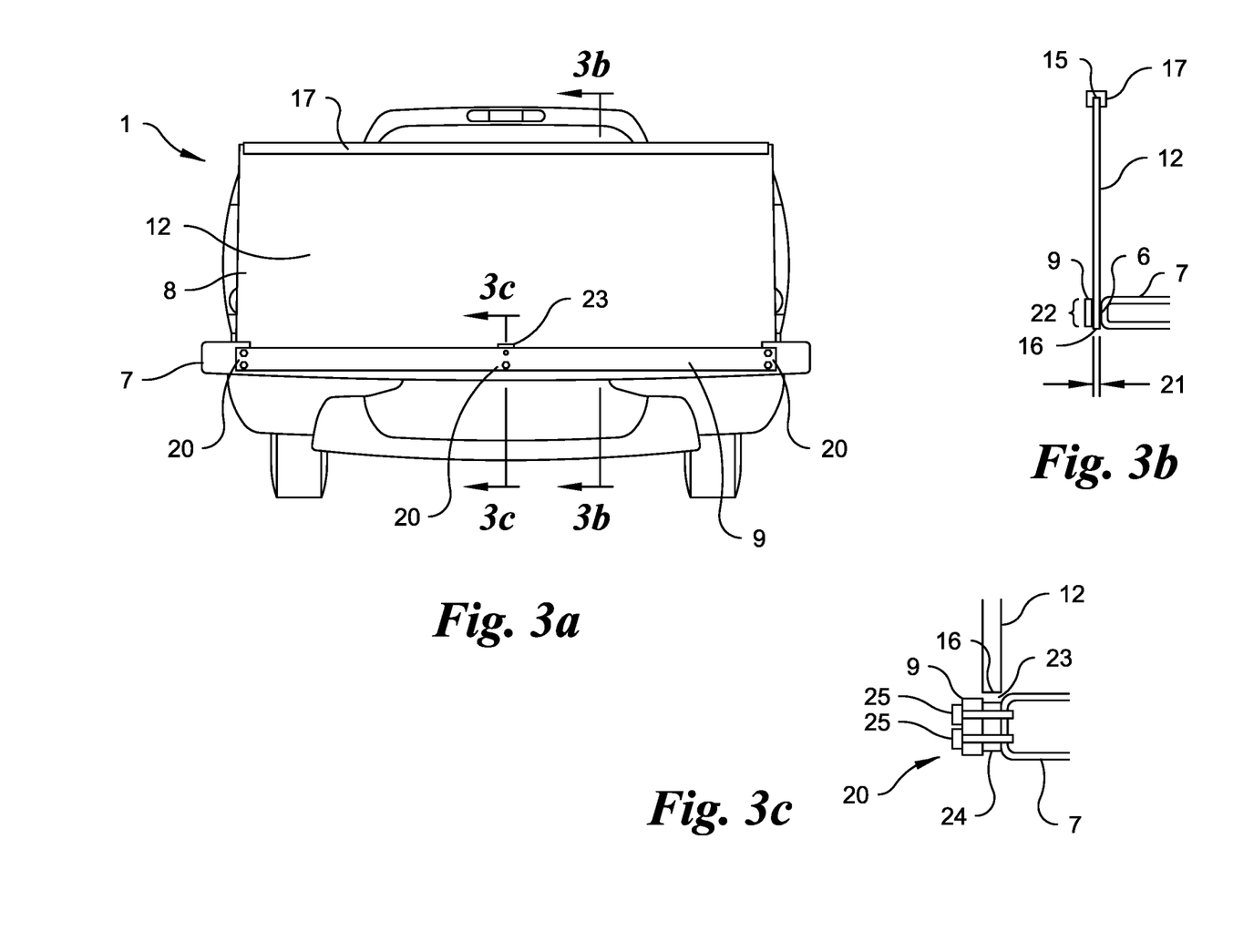
FIG. 3a is side view illustrating a back wall supported along an upper surface of a tailgate in a down and open configuration in accordance with an embodiment of the invention.
FIG. 3b is a cross-section view illustrating attachment of a lower end of the back wall to a tailgate via arrangement between a tab and a slot and attachment of an upper end of the back wall to a stiffener in accordance with an embodiment of the invention.
FIG. 3c is a cross-section view illustrating a mount point whereby a bracket is attached to the top end of the tailgate and a notch permits the back wall to be secured to the tailgate about the mount point in accordance with an embodiment of the invention.

Referring now to FIGS. 1, 3a and 3c, the bracket 9 for the vehicle bed extender 1 is secured to the top end 6 at two or more mount points 20 along the tailgate 7. For purpose of the present invention, a bracket 9 is understood to mean an element that is substantially straight, at least semi-rigid, and elongated examples including, but not limited to, a plate, a bar, and a rod composed of metal or other material suitable for securing the flexible member 8 to a tailgate 7. In some embodiments, it may be advantageous for the bracket 9 to be composed of two or more elements either attachable or extendable so as to achieve the required length.

For purpose of the present invention, a mount point 20 is understood to mean a location at which the bracket 9 is secured to the tailgate 7. A mount point 20 may include a spacer 24 interposed between the bracket 9 and the tailgate 7. The spacer 24 may be a rubber or other material suitable for separating the bracket 9 from the tailgate 7. A mount point 20 may further include one or more fasteners 25 that traverse the bracket 9, the spacer 24, and the tailgate 7 thereby mechanically securing the bracket 9 and the spacer 24 to the tailgate 7. Exemplary fasteners 25 include bolts, screws, clevis pins, and the like. In other embodiments, the bracket 9 and the spacer 24 may be secured to the tailgate 7 via an adhesive or other non-mechanical means.

Referring again to FIGS. 3a and 3c, the flexible member 8 is positioned adjacent to the bracket 9 so that the back wall 12 is generally aligned with the spacer 24. The notch 23 permits proper seating between the flexible member 8 and the bracket 9 along the back wall 12 at intermediate mount points 20. The lower end 16 of the back wall 12 may or may not contact the spacer 24 when the flexible member 8 is seated onto the tailgate 7.

Referring now to FIGS. 3a, 3b and 3c, the spacer 24 separates the bracket 9 from the top end 6 thereby providing a slot 21 between each adjoining pair of mount points 20. The width and length of the slot 21 should be sufficient to permit the tab 22 to engage and disengage the slot 21, preferably in a slidable fashion. In some embodiments, the tab 22 may be secured to the bracket 9 via a bolt, screw, clevis pin, and the like. The combined use of a stiffener 17 and the tab 22 and slot 21 engagement along the back wall 12 may be advantageous to maintaining the vertical orientation of the flexible member 8 and further to securing the flexible member 8 to the tailgate 7.

Referring again to FIGS. 3a and 3b, the stiffener 17 is an elongated element with a generally U-shaped cross section which permits assembly onto the back wall 12 of the flexible member 8. In some embodiments, it may be advantageous for the stiffener 17 to be composed of two or more elements either attachable or extendable so as to achieve the required length. The stiffener 17 may be composed of a plastic, metal, or other material suitable for stiffening the flexible member 8. The stiffener 17 is seated onto the back wall 12 by placing the open end of the U-shaped cross section over the upper end 15 and applying a seating force onto the stiffener 17 until the upper end 15 contacts the back wall 12 as shown in FIG. 3b. A clearance or interference fit between the open end of the U-shaped stiffener 17 and the back wall 12 may permit for a secure yet separable assembly. In other embodiments, a clevis pin or the like may mechanically secure the stiffener 17 to the back wall 12. Regardless of the fastening means, the stiffener 17 should be separable from the back wall 12 without damage to either component.

Figure 4A:
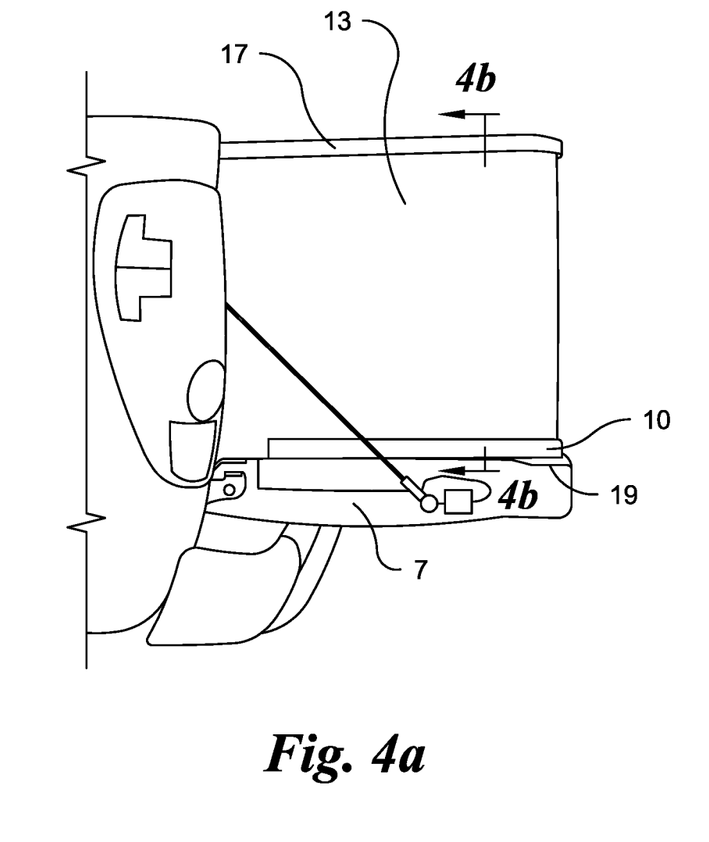
FIG. 4a is a side view illustrating an extension wall supported along an upper surface of a tailgate in a down and open configuration in accordance with an embodiment of the invention.
Figure 4B:
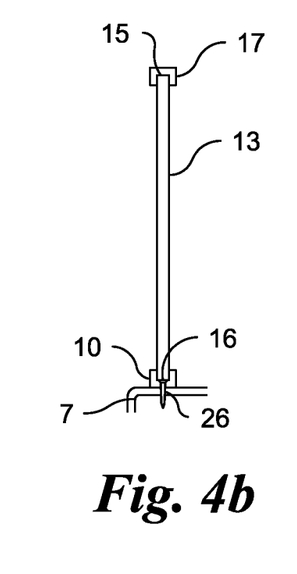
FIG. 4b is a cross-section view illustrating attachment of a lower end of the extension wall to a channel disposed along the tailgate and attachment of an upper end of the extension wall to a stiffener in accordance with an embodiment of the invention.

Referring now to FIGS. 4a and 4b, a stiffener 17 is seated and secured to the upper end 15 of the extension wall 13 by placing the open end of the U-shaped cross section over the upper end 15 and applying a seating force onto the stiffener 17 until the upper end 15 contacts the extension wall 13 as shown in FIG. 4b. A clearance or interference fit between the stiffener 17 and extension wall 13 may permit for a secure yet separable assembly. In other embodiments, a clevis pin or the like may be used to mechanically secure the stiffener 17 to the extension wall 13. Regardless of the fastening means, the stiffener 17 should be separable from the extension wall 13 without damage to either component.

Referring again to FIGS. 4a and 4b, a pair of optional channels 10 may be disposed along and secured to the upper surface 19 of the tailgate 7. Each channel 10 is an elongated element with a generally U-shaped cross section. A channel 10 may be composed of a plastic or other material suitable for securing an extension wall 13 to the tailgate 7. The channel 10 may be secured to the tailgate 7 via one more fasteners 26 which traverse the channel 10 and a portion of the tailgate 7 as illustrated in FIG. 4b. In other embodiments, the channel 10 may be secured to the tailgate 7 via an adhesive or other non-mechanical means. The open end of the channel 10 is dimensioned to accept the lower end 16. The extension wall 13 is secured to the channel 10 by placing the lower end 16 over the U-shaped opening and applying a force onto the extension wall 13 in the direction of the tailgate 7 until the lower end 16 is seated within the channel 10 as shown in FIG. 4b. A clearance or interference fit between the U-shaped channel 10 and the extension wall 13 may permit for a secure yet separable assembly. The extension wall 13 should be separable from the channel 10 without damage to either component.

Figure 5A:
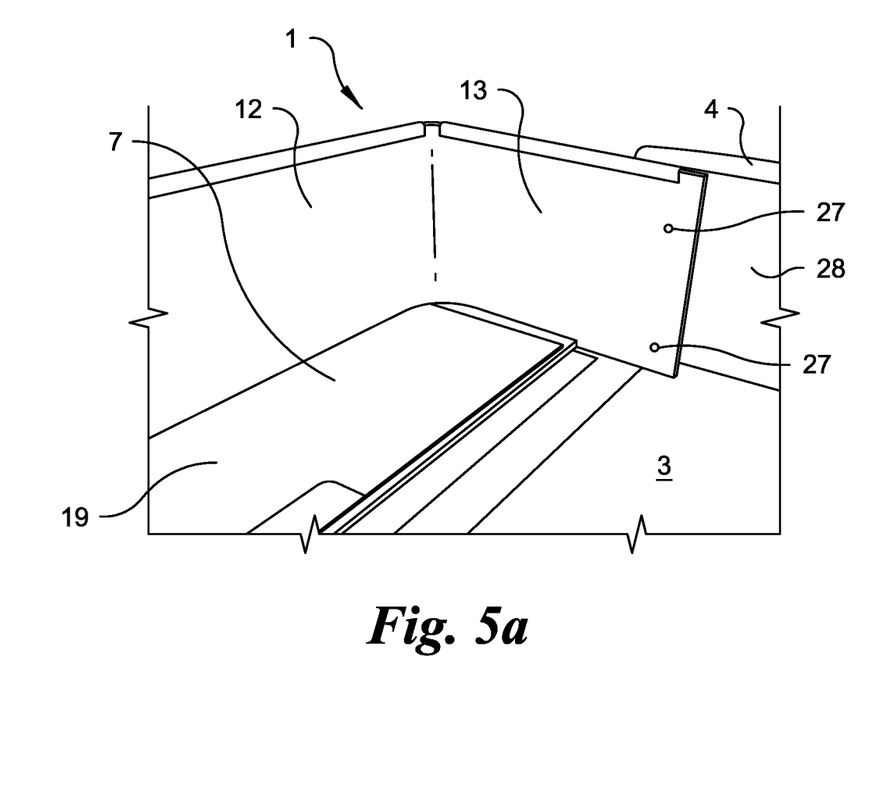
FIG. 5a is a perspective interior view illustrating a vehicle bed extender disposed about a tailgate so that a storage area is enlarged by the dimensions of a tailgate in accordance with an embodiment of the invention.

Referring now to FIG. 5a, the extension walls 13 and the back wall 12 are positioned about the tailgate 7 so that storage area 3 is enlarged by the vehicle bed extender 1 to include at least a portion of the area of the upper surface 19. Each extension wall 13 extends beyond the upper surface 19 so as to overlay a portion of the inside surface 28 of the side wall 4. The extension wall 13 is secured to the side wall 4 via one or more anchors 27. While various securing means are possible, the extension wall 13 should be separable from the side wall 4 without damage thereto.

Figure 5B:
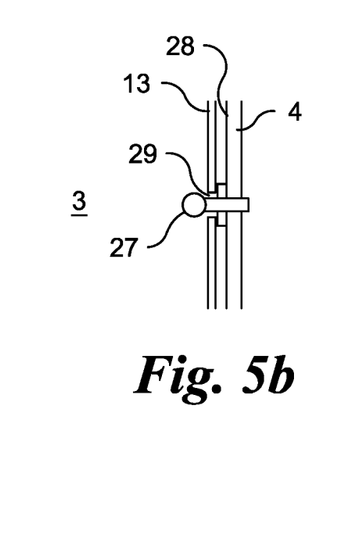
FIG. 5b is an enlarged cross-section view illustrating attachment of an extension wall to a side wall of a vehicle whereby a hole along the extension wall engages an anchor secured to and extending from the side wall in accordance with an embodiment of the invention.

Referring now to FIG. 5b, the anchor 27 is mechanically fastened to the inside surface 28 of the side wall 4 so as to extend therefrom in the direction of the storage area 3. One non-limiting example of an anchor 27 is a sleeve anchor. A hole 29 along the extension wall 13 may slidingly engage the anchor 27 so that the anchor 27 fully traverses the extension wall 13. The hole 29 may be dimensioned for an interference fit with at least a portion of the anchor 27 so as to prevent inadvertent separation of the extension wall 13 from the side wall 4.

Figure 5C:
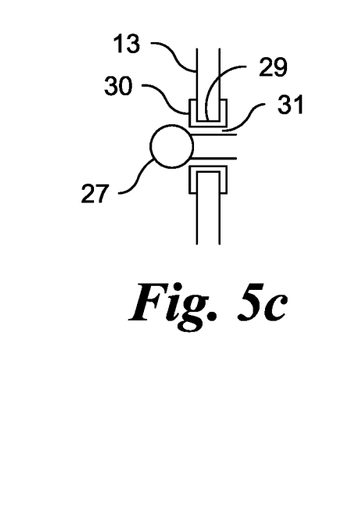
FIG. 5c is an enlarged view illustrating a grommet disposed within the hole along the extension wall whereby a hole along the grommet engages the anchor extending from the side wall of the vehicle in accordance with an embodiment of the invention.

Referring now to FIG. 5c, a grommet 30 may be secured to the hole 29 along the extension wall 13. The extension wall 13 is secured to a side wall 4 by placing the anchor 27 through the hole 31 along the grommet 30. The hole 31 may be dimensioned for an interference fit with at least a portion of the anchor 27 so as to prevent inadvertent separation of the extension wall 13 from the side wall 4.

Figure 6A:
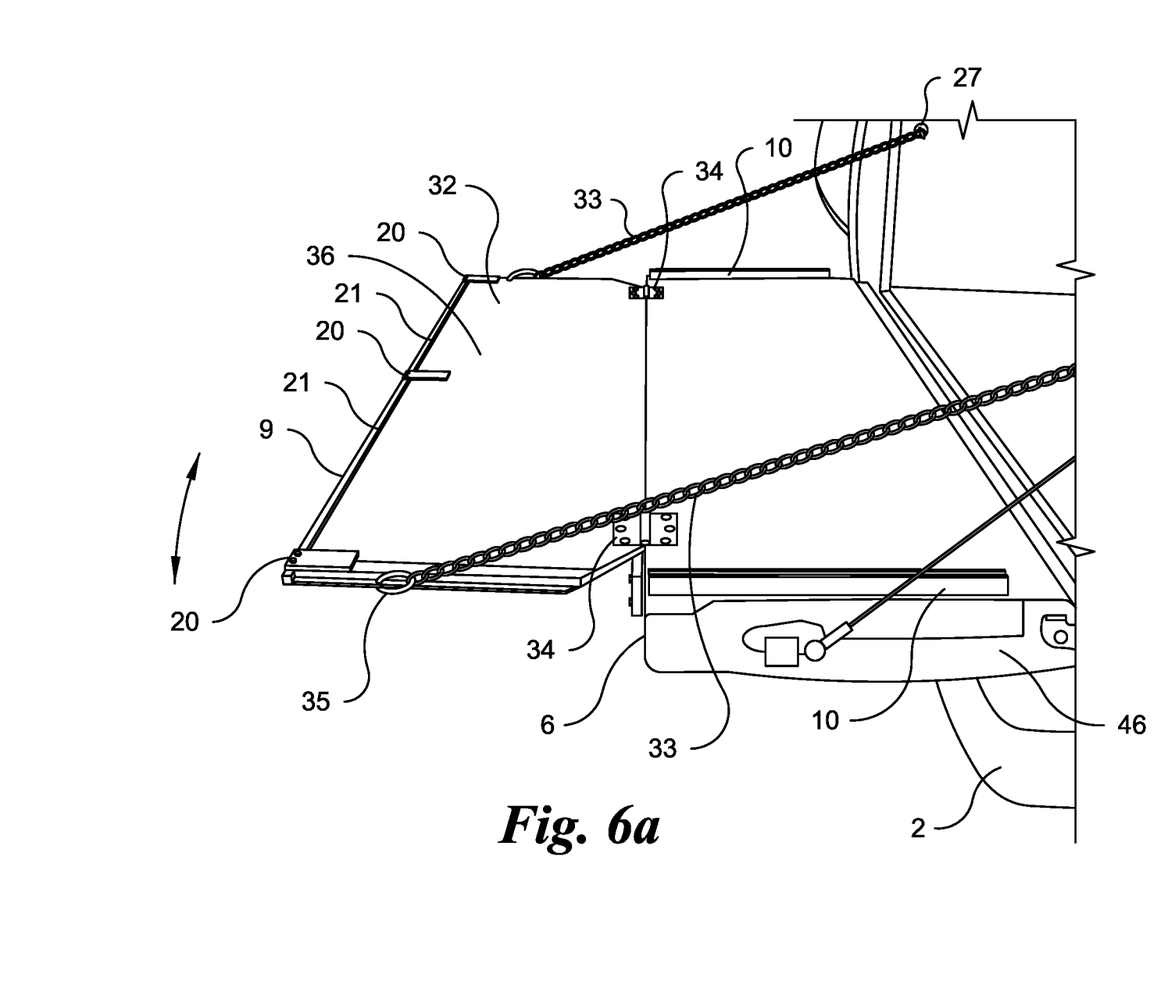
FIG. 6a is a side elevation view illustrating a primary tailgate disposed in a down and open position at the back end of a vehicle and a rigid secondary tailgate rotatably attached to the primary tailgate in accordance with an embodiment of the invention.

Referring now to FIG. 6a, it may be advantageous in some embodiments to provide a rigid secondary tailgate 32 extendable from the tailgate 7 otherwise shown in FIG. 1 For purpose of this embodiment, the tailgate 7 is now referred to as a primary tailgate 46. It is also understood that a rigid secondary tailgate 32 may be the tailgate 7 or other similar structures extending from the primary tailgate 46.

Referring again to FIG. 6a, the rigid secondary tailgate 32 in some embodiments is generally defined by a panel 36 composed of a plastic, composite, and/or metal capable of supporting materials extending onto the rigid secondary tailgate 32 from the primary tailgate 46. The rigid secondary tailgate 32 may be secured to the primary tailgate 46 via one or more hinges 34 which permit rotation with respect to the primary tailgate 46 adjacent to the top end 6. This arrangement allows the rigid secondary tailgate 32 to fold unto the primary tailgate 46 when not in use. A pair of optional supports 33 may be advantageous to further secure the rigid secondary tailgate 32 to a vehicle 2. In one example, each support 33 is a chain-like element securable at one end to an anchor 27 attached to the vehicle 2 and securable at another end to the rigid secondary tailgate 32 via a mechanical fastener 35, one non-limiting example of the latter being a hook and loop combination.

Figure 6B:
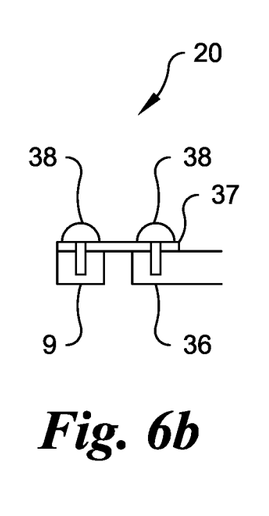
FIG. 6b is an enlarged cross-section view illustrating a mount point whereby a bracket is secured to a panel of the rigid secondary tailgate in accordance with an embodiment of the invention.

Referring now to FIGS. 6a and 6b, the bracket 9 is secured to the panel 36 at two or more mount points 20. A spacer 37 is attached at one end to the bracket 9 via one fastener 38 and at another end to the panel 36 via another fastener 38. The spacer 37 may be composed of a metal or other material suitable for securing the bracket 9 to the panel 36. The bracket 9 is separated from and secured to the panel 36 via the spacer 37 at each mount point 20 thereby forming a slot 21 between each adjoining pair of mount points 20.

Figure 7:
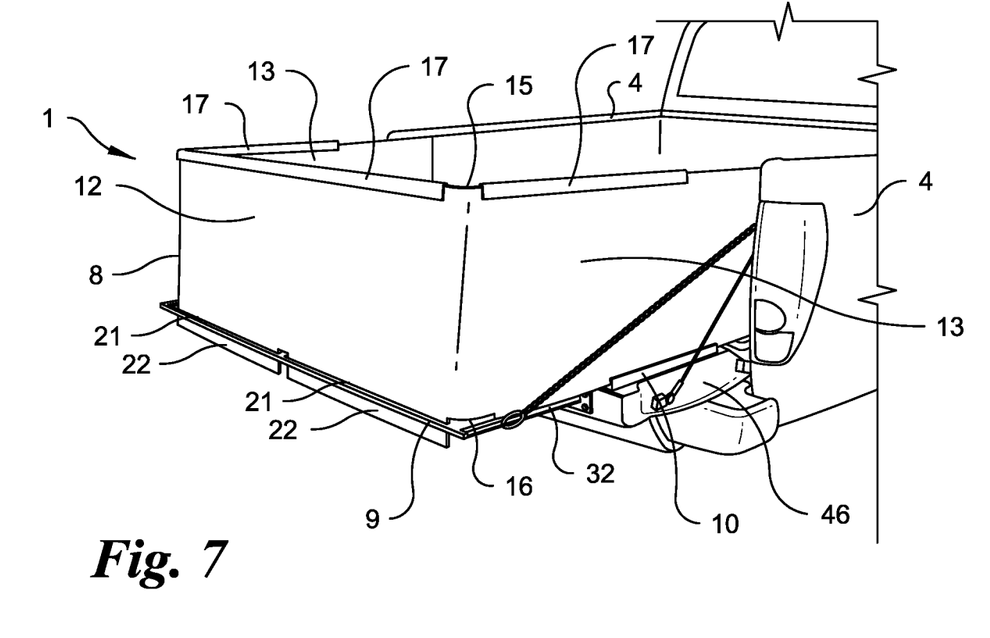
FIG. 7 is a perspective view illustrating a vehicle bed extender including a flexible member defining a back wall disposed between a pair of extension walls whereby the vehicle bed extender is attachable at the back end of a vehicle so that a storage area is enlarged by at least the dimensions of a primary tailgate and a rigid secondary tailgate in accordance with an embodiment of the invention.

Referring again to FIGS. 7 and 6b, the vehicle bed extender 1 is assembled by placing the flexible member 8 onto the rigid secondary tailgate 32 and the primary tailgate 46. The back wall 12 is secured to the rigid secondary tailgate 32 by slidingly engaging the tabs 22 into the slots 21. In some embodiments, the tab 22 may be secured to the bracket 9 via a bolt, screw, clevis pin, and the like. A portion of each tab 22 may extend below the bracket 9. A stiffener 17 may be secured to the upper end 15 along each of the back wall 12 and the extension walls 13. It may be advantageous in some embodiments for the lower end 16 to be secured to optional channels 10 along the primary tailgate 46. Each extension wall 13 is secured to a side wall 4 as described herein so that storage area 3 is enlarged by the primary tailgate 46 and the rigid secondary tailgate 32.

Figure 8:
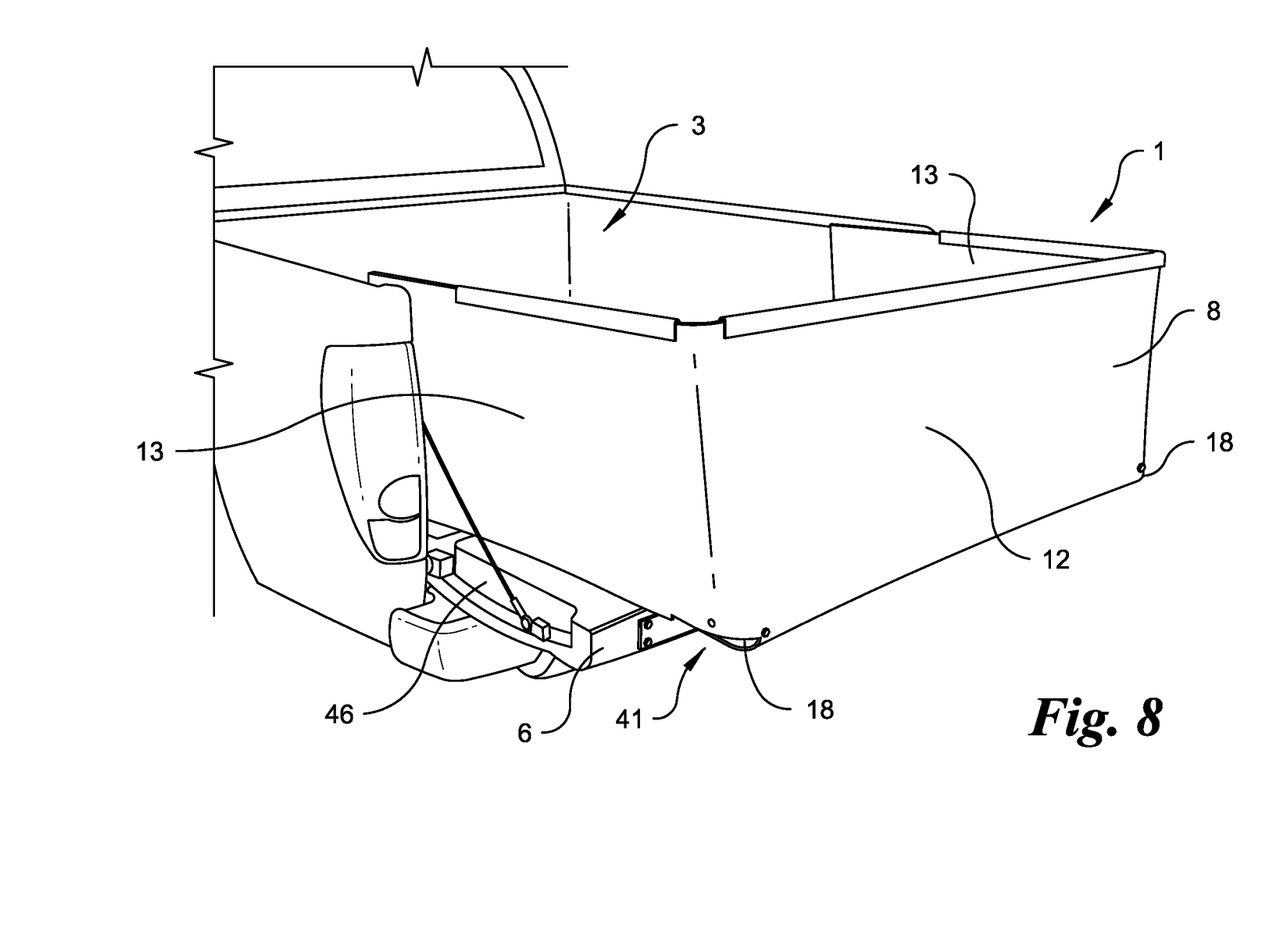
FIG. 8 is a perspective view illustrating a vehicle bed extender including a flexible member defining a back wall disposed between a pair of extension walls whereby the vehicle bed extender is disposed at the back end of a vehicle so that a storage area is enlarged by at least the dimensions of a primary tailgate and a flexible secondary tailgate in accordance with an embodiment of the invention.

Referring now to FIG. 8, it may be advantageous in other embodiments of the vehicle bed extender 1 to provide a flexible secondary tailgate 41 that extends outward from the tailgate 7. For purpose of this embodiment, the tailgate 7 is now referred to as a primary tailgate 46. The flexible secondary tailgate 41 is provided by the flexible member 8 whereby the back wall 12 and a portion of each extension wall 13 overhang or extend beyond the top end 6 of the primary tailgate 46. The back wall 12 and the extension walls 13 are secured to the primary tailgate 46 and side walls 4 as described herein so that storage area 3 is enlarged by the primary tailgate 46 and the flexible secondary tailgate 41.

Figure 9A:
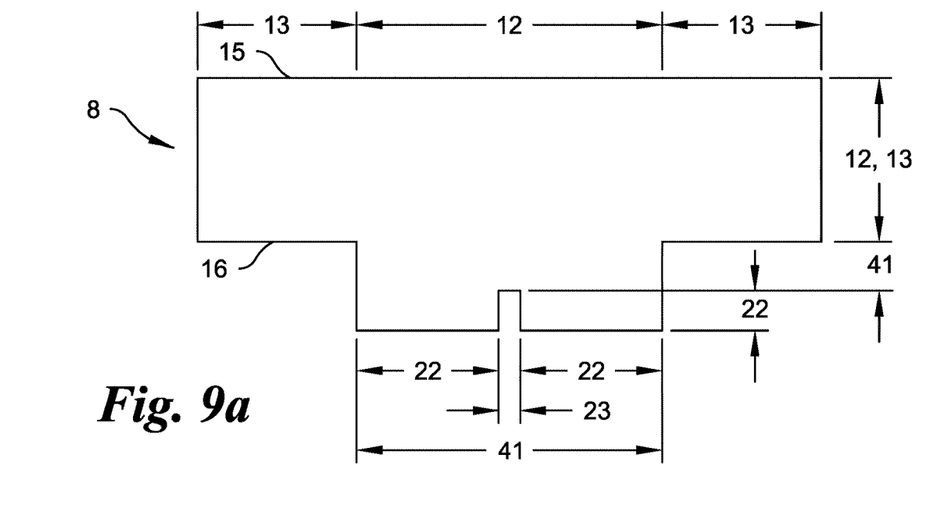
FIG. 9a is a plan view illustrating a flexible member before attachment onto a vehicle whereby the flexible member defines a back wall, a pair of extension walls, a flexible secondary tailgate, and a pair of tabs in accordance with an embodiment of the invention.
Figure 9B:
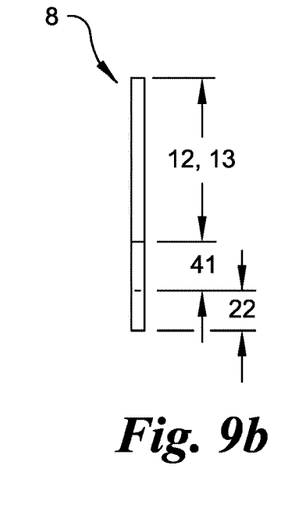
FIG. 9b is a side view further illustrating the flexible member in FIG. 9a in accordance with an embodiment of the invention.

Referring now to FIGS. 9a and 9b, the flexible member 8 is now configured to define a pair of extension walls 13 separately disposed about a back wall 12 between an upper end 15 and a lower end 16 whereby a flexible secondary tailgate 41 and at least one tab 22 extend therefrom. The flexible secondary tailgate 41 extends from the lower end 16 along the back wall 12. Each tab 22 extends from the flexible secondary tailgate 41 in the direction away from the flexible secondary tailgate 41 and the back wall 12. This arrangement places the flexible secondary tailgate 41 between the back wall 12 and the tab(s) 22. In preferred embodiments, a notch 23 is provided between adjoining tabs 22.

Figure 10A:
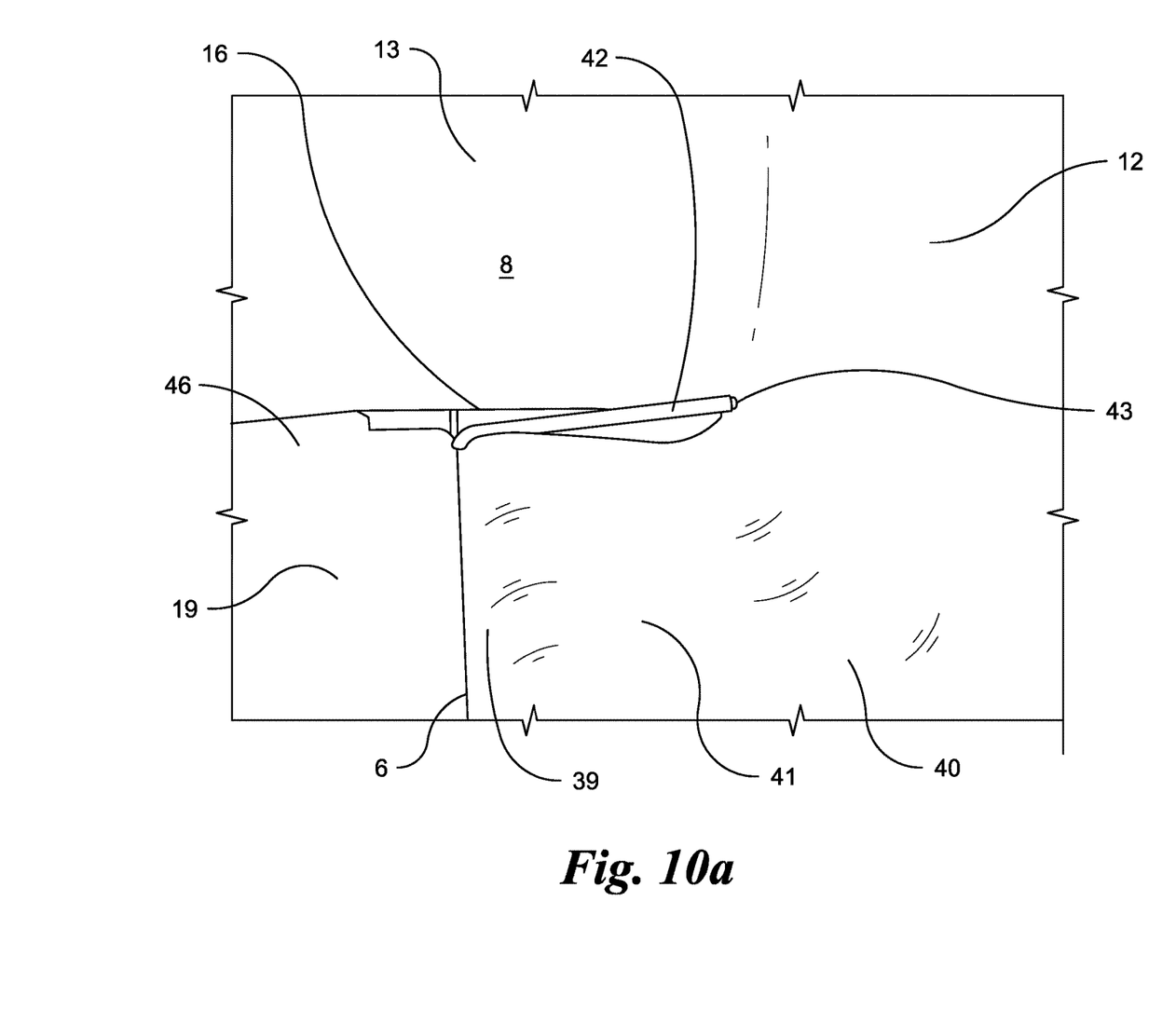
FIG. 10a is an enlarged interior elevation view illustrating a flexible secondary tailgate formed between a pair of folds along a flexible member so as to extend from a primary tailgate whereby the flexible secondary tailgate is supported in part by a support arm in accordance with an embodiment of the invention.
Figure 10B:
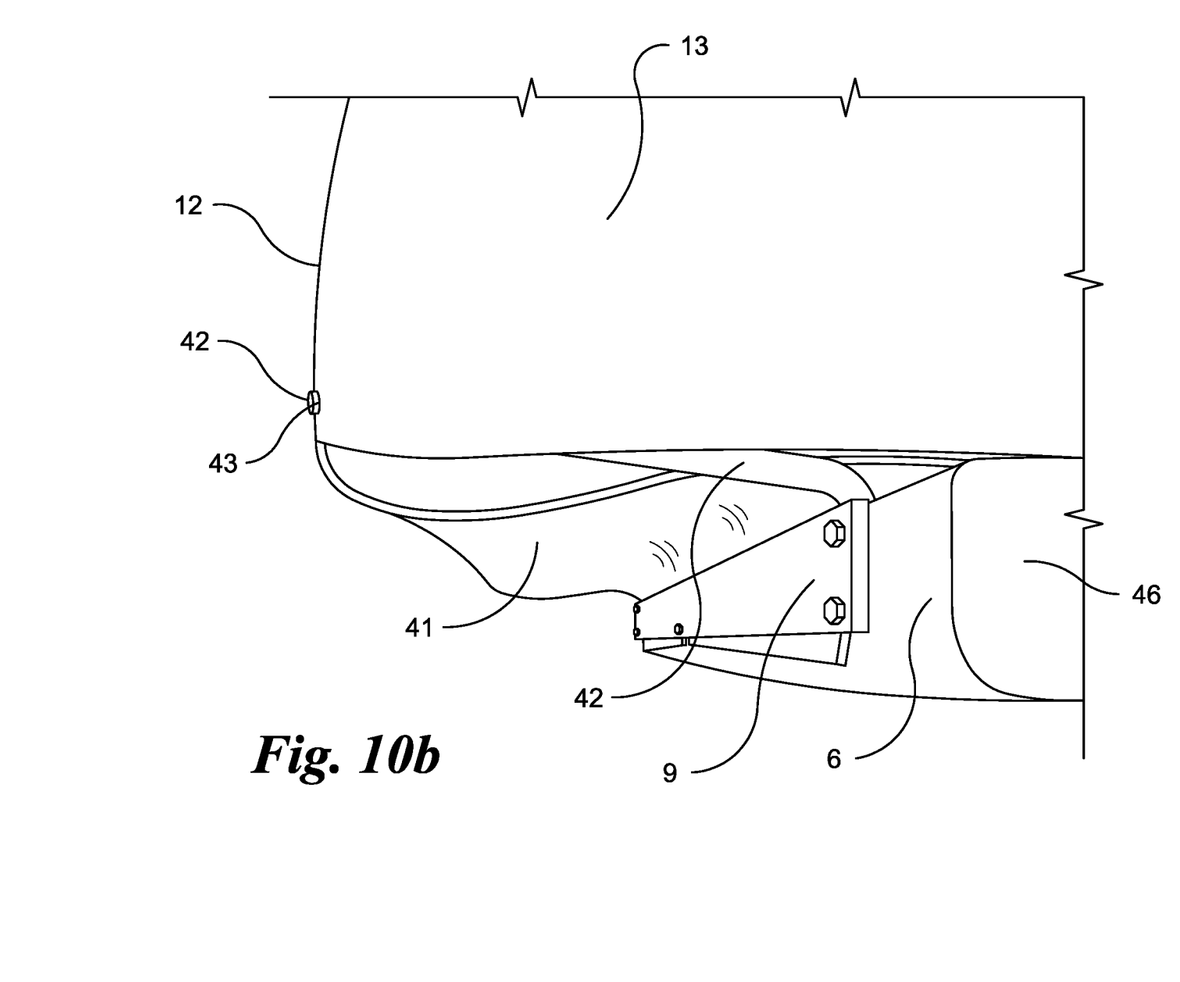
FIG. 10b is an enlarged exterior elevation view further illustrating arrangement of the flexible member in FIG. 10a to form the back wall, the extension wall, and the flexible secondary tailgate so that the back wall and a portion of the extension walls overhang the primary tailgate about the flexible secondary tailgate in accordance with an embodiment of the invention.

Referring now to FIGS. 10a, 10b and 8, the flexible member 8 is assembled onto the primary tailgate 46 so that the flexible secondary tailgate 41 is interposed between a first bend 39 adjacent to the top end 6 and a second bend 40 adjacent to the back wall 12. The flexible secondary tailgate 41 is substantially horizontally disposed in a planar arrangement generally aligned with the upper surface 19. Each tab 22 is substantially perpendicular to the flexible secondary tailgate 41 and secured within a slot 21 as described in FIG. 3b. The back wall 12 is substantially perpendicular to the flexible secondary tailgate 41 so as to extend upward thereform. The flexible secondary tailgate 41, the back wall 12, and the extension walls 13 cooperate to form a pair of corners 18 which encloses the flexible secondary tailgate 41 within the storage area 3. In preferred embodiments, the flexible secondary tailgate 41 is generally aligned along the lower end 16.

Figure 11A:
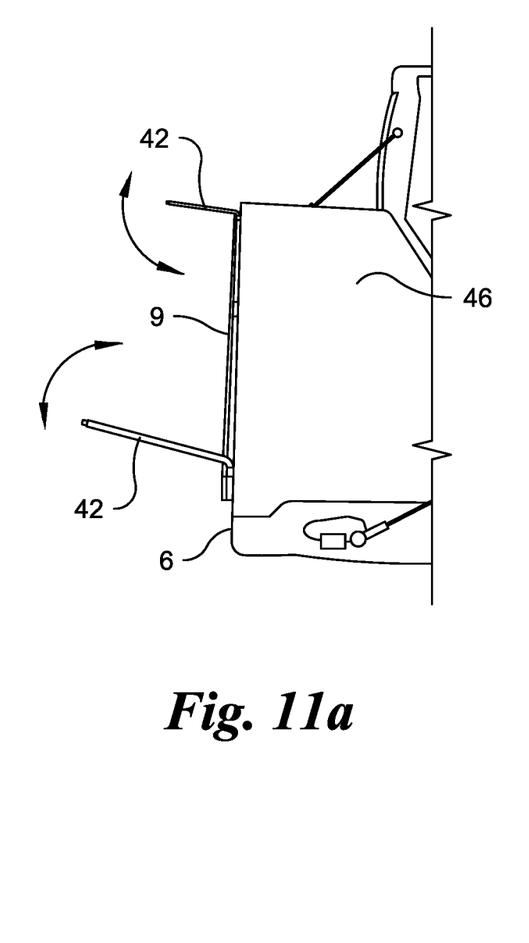
FIG. 11a is a side elevation view illustrating support arms rotatably attached to a tailgate in accordance with an embodiment of the invention.

Referring now to FIGS. 10a, 10b and 11a, optional support arms 42 are attached to and extend outward from the primary tailgate 46 adjacent to the top end 6. A support arm 42 may be oriented parallel to or at an angle with respect to the top surface 19. In preferred embodiments, the support arm 42 is aligned with the upper surface 19. One end of the support arm 42 is secured to the primary tailgate 46 between the top end 6 and the bracket 9. Another end of the support arm 42 is secured to the flexible member 8. In preferred embodiments, the support arm 42 engages a hole 43 along the back wall 12 adjacent to the extension wall 13. The hole 43 may include a grommet 30 or the like described in FIG. 5c.

For purpose of the present invention, the support arm 42 is generally understood to be a rigid element suitable for supporting at least a portion of the weight of the flexible member 8 and/or maintain the shape or position of the back wall 12 and/or the extension wall 13. The tailgate 46 may support another portion of the weight of the flexible member 8.

Figure 11B:
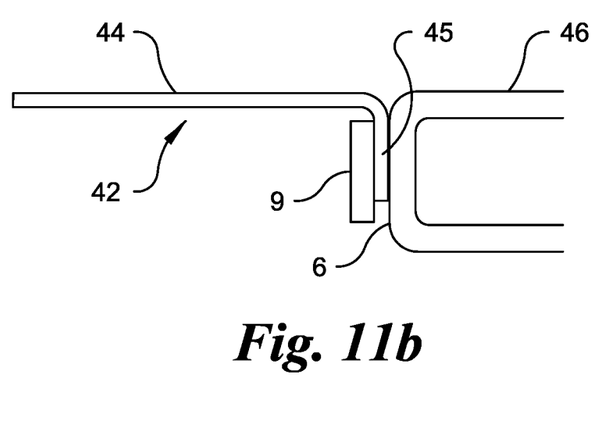
FIG. 11b is an enlarged vertical cross-section view illustrating a horizontal member and a vertical member comprising a generally L-shaped support arm whereby the vertical member is disposed between a tailgate and a bracket in accordance with an embodiment of the invention.
Figure 11C:
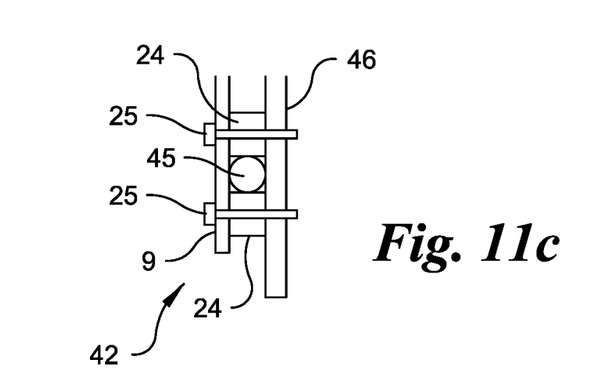
FIG. 11c is an enlarged horizontal cross-section view illustrating arrangement between the vertical member in FIG. 11b and a pair of spacers at the mount point in accordance with an embodiment of the invention.

Referring now to FIGS. 11b, 11c and 10a, one specific example of the support arm 42 includes a horizontal member 44 substantially perpendicular to a vertical member 45. In preferred embodiments, the horizontal member 44 and the vertical member 45 have a rounded cross section. The horizontal member 44 should be sufficiently long so as to traverse the length of the flexible secondary tailgate 41 so that the outward disposed end mechanically engages the flexible member 8. The vertical member 45 is interposed between the bracket 9 and the top end 6 of the primary tailgate 46 so that the horizontal arm 44 extends over the bracket 9 and is rotatable with respect to the bracket 9 and the primary tailgate 46.

Referring now to FIG. 11c, the vertical member 45 is further interposed between a pair of spacers 24. In this arrangement, the vertical member 45 is bounded by the bracket 9, the primary tailgate 46, and the spacers 24 at the mount point 20. A fastener 25 traverses the bracket 9, the spacer 24, and a portion of the structure comprising the primary tailgate 46 thereby securing the support arm 42 to the primary tailgate 46 via the vertical member 45. In preferred embodiments, the vertical member 45 has a rounded cross section to permit rotation of the support arm 42. This feature allows the support arm 42 to be rotated to an extended configuration when the vehicle bed extender 1 is assembled onto a vehicle 2 and rotated to a retracted configuration so that the horizontal arm 44 is parallel to the top end 6 when the vehicle bed extender 1 is disassembled from a vehicle 1.

The description above indicates that a great degree of flexibility is offered in terms of the present invention. Although various embodiments have been described in considerable detail with reference to certain preferred versions thereof, other versions are possible. Therefore, the spirit and scope of the appended claims should not be limited to the description of the preferred versions contained herein.

As is evident from the explanation herein, the described invention is a vehicle bed extender applicable, by way of non-limiting examples only, to enlarging the storage capacity of ground vehicles including a bed defined by side walls and a tailgate.

What is claimed is:

1. A vehicle bed extender comprising:
(a) a flexible member forming a back wall, a pair of extension walls separately disposed about said back wall, and at least one tab wherein said flexible member is a single continuous sheet of bendable material, said back wall and said extension walls have an upper end and a lower end, each said tab extends from said lower end along said back wall, each said extension wall removably attachable to a side wall of a vehicle;
(b) a bracket secured to one end of a tailgate at at least two mount points, each said mount point includes at least one spacer disposed between and contacting said bracket and said tailgate, said bracket and said at least one spacer secured to said tailgate at each said mount point, said at least one spacer separates and prevents contact between said bracket and said tailgate, said bracket, said tailgate, and said at least one spacer at each said mount point define a slot between each adjacent pair of said mount points, said tab slidingly engages said slot so that said tab is bounded by said bracket, said tailgate, and said at least one spacer at each of adjacent said mount points and said tab extends vertically with respect to said bracket and said tailgate, said flexible member secured to said tailgate via contact between said tab and each of said bracket, said tailgate, and said at least one spacer at each adjacent pair of said mount points that define said slot; and (c) at least one stiffener removably attached to said flexible member at said upper end.

2. The vehicle bed extender of claim 1, wherein said flexible member is a rubber belt.

3. The vehicle bed extender of claim 2, wherein said rubber belt is fiber reinforced.

4. The vehicle bed extender of claim 2, wherein said rubber belt is wire reinforced.

5. The vehicle bed extender of claim 1, wherein said stiffener is disposed along at least a portion of said extension wall.

6. The vehicle bed extender of claim 1, wherein said stiffener is disposed along at least a portion of said back wall.

7. The vehicle bed extender of claim 1, further comprising:

(d) at least one channel secured to said tailgate, said extension wall removably attached to said channel at said lower end.

8. The vehicle bed extender of claim 1, wherein said extension wall removably attachable to said side wall via an anchor along said side wall.

9. The vehicle bed extender of claim 8, wherein a hole along said extension wall engages said anchor.

10. The vehicle bed extender of claim 8, wherein a grommet along said extension wall slidingly engages said anchor.

11. The vehicle bed extender of claim 1, wherein said tailgate being a primary tailgate rotatably attached to said vehicle.

12. The vehicle bed extender of claim 11, further comprising:

(d) a flexible secondary tailgate defined by a substantially horizontal portion of said flexible member disposed between and substantially perpendicular to each of said at least one tab and said back wall, said substantially horizontal portion, said back wall, and portion of each said extension wall overhang and extend from said primary tailgate, said flexible member encloses said substantially horizontal portion and said primary tailgate so that a storage area of said vehicle is enlarged by both said substantially horizontal portion and said primary tailgate.

13. The vehicle bed extender of claim 12, further comprising:

(e) a pair of rotatable support arms separately attached at one end to said primary tailgate and separately securable at another end to said flexible member, each said rotatable support arm includes a horizontal member and a vertical member whereby said vertical member is rotatably disposed between and contacts two of said spacers and said vertical member is rotatably disposed between and contacts said bracket and said tailgate.

14. The vehicle bed extender of claim 1, wherein said tailgate being a rigid secondary tailgate rotatably attached to a primary tailgate, said primary tailgate rotatably attached to said vehicle, said flexible member encloses said rigid secondary tailgate and said primary tailgate so that a storage area of said vehicle is enlarged by both said rigid secondary tailgate and said primary tailgate.

15. The vehicle bed extender of claim 14, further comprising:

(d) at least one channel secured to said primary tailgate, said extension wall removably attached to said channel at said lower end.

* * * * *